(12) United States Patent
Curtis et al.

(10) Patent No.: US 9,716,544 B2
(45) Date of Patent: *Jul. 25, 2017

(54) WIRELESS SOFTWARE DIALER FOR SATELLITE COMMUNICATION DEVICE

(71) Applicant: LATITUDE TECHNOLOGIES CORPORATION, Victoria (CA)

(72) Inventors: Timothy Curtis, Brentwood Bay (CA); Mark Insley, Victoria (CA); David Martin, Victoria (CA)

(73) Assignee: Latitude Technologies Corporation, Victoria (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/331,749

(22) Filed: Oct. 21, 2016

(65) Prior Publication Data

US 2017/0041064 A1 Feb. 9, 2017

Related U.S. Application Data

(63) Continuation-in-part of application No. 14/762,188, filed as application No. PCT/IB2013/051884 on Mar. 10, 2013, now Pat. No. 9,509,395.

(51) Int. Cl.
*H04W 4/00* (2009.01)
*H04B 7/185* (2006.01)
(Continued)

(52) U.S. Cl.
CPC ......... *H04B 7/18508* (2013.01); *B64D 47/00* (2013.01); *G01S 19/17* (2013.01);
(Continued)

(58) Field of Classification Search
CPC ...... H04B 7/18508; H04L 67/12; H04W 4/14; H04W 84/12; B64D 47/00; G01S 19/17
(Continued)

(56) References Cited

U.S. PATENT DOCUMENTS 7,280,498 B1 * 10/2007 Mitchell ............ H04B 7/18508
370/316
8,353,006 B2   1/2013 Lynch et al.
(Continued)

OTHER PUBLICATIONS

International Search Report and Written Opinion issued by the ISA/CA in PCT/IB2013/051884 on Nov. 21, 2013 (9 pages).

*Primary Examiner* — Huy C Ho
(74) *Attorney, Agent, or Firm* — Baumgartner Patent Law; Marc Baumgartner (57) ABSTRACT

An aircraft communication system is provided that includes: i) a self-contained onboard communication system, the onboard communication system comprising a first peripheral device and an at least one second peripheral device, the first and second peripheral devices each comprising a non-transitory computer-readable medium, having stored thereon a computer program for data communication, the computer program having a plurality of protocols, the protocols being extensible, the protocols executable by a processor to cause the first and second peripheral devices to send data and commands between one another, the first peripheral device further caused to perform the steps of: directly controlling a satellite communication device; directly dialing the satellite communication device; sending data directly to the satellite communication device; and receiving data from the satellite communication device, each of said steps being performed without the assistance of an on-board server.

20 Claims, 2 Drawing Sheets

(51) Int. Cl.
    *H04L 29/08*     (2006.01)
    *H04W 4/14*      (2009.01)
    *B64D 47/00*     (2006.01)
    *G01S 19/17*     (2010.01)
    *H04W 40/00*     (2009.01)
    *H04W 84/12*     (2009.01)

(52) U.S. Cl.
    CPC ............... *H04L 67/12* (2013.01); *H04W 4/14* (2013.01); *H04W 84/12* (2013.01)

(58) Field of Classification Search
    USPC ........................................................ 455/427
    See application file for complete search history.

(56) References Cited

U.S. PATENT DOCUMENTS

2006/0270470 A1*  11/2006  de La Chapelle .... B64C 1/1492
                                                455/575.5
2008/0204268 A1    8/2008  Dowling et al.
2012/0240170 A1*   9/2012  Lynch ................ H04B 7/18508
                                                725/71

* cited by examiner

WIRELESS SOFTWARE DIALER FOR SATELLITE COMMUNICATION DEVICE

CROSS REFERENCE TO RELATED APPLICATIONS

This present invention is a Continuation-in-Part of U.S. patent application Ser. No. 14/762,188, filed Jul. 20, 2015, which is a U.S. national phase of International Application No. PCT/IB2013/051884, filed Mar. 10, 2013, which designated the U.S. and which are hereby incorporated in their entirety including all tables, figures, and claims.

FIELD OF THE INVENTION

The present technology relates to a controller for a communication system for use in vehicles. More specifically, it relates to a software-based system and device for use in aircraft that provides the ability to control a satellite communication device.

BACKGROUND OF THE INVENTION

In recent years, there has been rapid development of new communication systems and methods of communicating. The early cellular phones were limited to analogue operation, communicated specifically over a cellular network and allowed for voice communication only. Later, digital operation was introduced and soon thereafter, the keypads were utilized to provide rudimentary text messaging. Modern wireless devices, including cell phones have sufficient bandwidth to enable the transfer of voice signals, image data, and even video streaming. In addition, most cell phones provide network access, such as Internet access through network interfaces such as Wi-Fi, Bluetooth® and WiMax, for example. This allows the cell phones to communicate with other electronic devices.

Satellite communication and satellite phones have also undergone a transformation in recent years. The phones provide similar functionality to cellular phones including voice communication, short messaging service and low-bandwidth Internet access.

In truly mobile situations, such as in an aircraft, communication usually involves a satellite and a satellite network. Data are sent from the mobile location by an onboard satellite communication system. The satellite network may then communicate data to a base station directly, or, as is the case more recently, communicate data via the internet to the base station.

While these communication means are providing ever-expanding capabilities, they cannot always provide reliable communication. This is in part because of the bandwidth available, the size of the data being sent, and the reliability of the system to accurately transform the data. Another deficiency is the ability to meld the technologies together, so that a mobile device can interact with the onboard satellite communication system, thereby accessing satellite-based communications.

It is an object of the present technology to provide a peripheral device, system and method that can reliably and accurately control a satellite communication (satcom) device by sending commands to the device. The peripheral device additionally can transmit text and binary messages to the onboard satellite communication system and then to a recipient device or base station. It is a further objective to provide this service without the use of specific hardware, keypads and screens that are purpose built but rather with a multifunctional peripheral device that is easy to use and has extensible protocols for command controls.

SUMMARY OF THE INVENTION

While various exemplary embodiments are discussed and contemplated herein, the present disclosure provides many concepts that can be embodied in a wide variety of specific contexts. The specific embodiments discussed herein are therefore, merely illustrative of specific ways to make and use the invention as ultimately claimed and are not meant to limit the invention in any way. Accordingly, for the ease of discussion, communication systems, methods and device embodiments are described below, as exemplary embodiments, and the description of specific exemplary embodiments is not intended to limit the exemplary embodiments disclosed herein.

In one embodiment, a system for communicating within an aircraft and between an aircraft and a base station is provided, the system comprising: a first programmable peripheral device, the first programmable peripheral device programmed to directly control a satellite communications device in an aircraft without the assistance of an on-board server, the first programmable peripheral device comprising software and a messaging tool; an at least one second programmable peripheral device, the second programmable peripheral device comprising software, an interface to the first programmable peripheral device, and an at least one application, the second programmable peripheral device programmed to send and receive commands and data between the application and the first programmable peripheral device; a satellite; and the base station, wherein the satellite communications device is programmed to send commands and transfer data between the satellite communication device and the satellite, and the satellite is configured to transfer data between the satellite and the base station.

In the system, the first programmable peripheral device may further comprise an extensible protocol for data transfer directly to the satellite communications phone, including messaging, texting, and Short Message Service (SMS).

In the system, the first programmable peripheral device may communicate to the satellite communications phone sending commands to the satellite communications phone and sending data to and receiving data from the satellite communications phone.

The system may further comprise an aircraft data monitoring device.

In the system, the second peripheral device may be a flight data monitoring device.

In the system, the first peripheral device may further comprise a keypad.

In the system, the second peripheral device may comprise a plurality of applications.

The system may further comprise a plurality of programmable peripheral devices, each programmable peripheral device comprising software, an interface to another programmable peripheral device, and an at least one application, the plurality of programmable peripheral devices programmed to send and receive commands and data between the application and another programmable peripheral device.

In the system, the plurality of programmable peripheral devices may be functionally in a series, and the series of programmable peripheral devices may be programmed to send the data from the second peripheral device to the first peripheral device via the series of peripheral devices.

In the system, the series may be a dynamic series.

In another embodiment, a system for communicating between an at least one application in an aircraft and a base station is provided, the system comprising: a first programmable peripheral device; a second programmable peripheral device; an onboard satellite communication device; a satellite; and the base station, wherein the at least one application collects data, the second programmable peripheral device is programmed to send and receive data and commands from the first programmable peripheral device and comprises software and an interface to the first programmable peripheral device, the first programmable peripheral device is programmed to send commands and the data to the onboard satellite communication device and to receive data from the onboard satellite communication device without the assistance of an on-board server, and comprises software, a messaging tool, and a controller for the onboard satellite communication device and wherein the onboard satellite communication device is programmed to send commands and transfer data between the satellite communication device and the satellite, the satellite for transferring data between the satellite and the base station.

In the system, the first programmable peripheral device may further comprise an extensible protocol for data transfer directly to the satellite communications phone, including messaging, texting, and Short Message Service (SMS).

The system may further comprise a plurality of programmable peripheral devices functionally arranged in a series, wherein the series of programmable peripheral devices are programmed to send the data from the second peripheral device to the first peripheral device via the series of peripheral devices.

In the system, the satellite communication device may be a satellite communications phone.

In another embodiment, a method of communicating between an at least one application in an aircraft and a base station is provided, the method comprising:
employing a first programmable peripheral device comprising software or firmware, and a messaging head to control a satellite communication device, without the assistance of an on-board server and a second programmable peripheral device comprising software, an interface to the first programmable peripheral device, and an at least one application;
sending commands and data to and from the second programmable peripheral device to the first programmable peripheral device;
transferring data directly between the first programmable peripheral device and the satellite communication device;
transferring data between the satellite communication device and a satellite;
transferring data between the satellite and the base station; and
decoding the data.

The method may further comprise streaming aircraft data.

In the method, the aircraft data may be flight data.

In yet another embodiment, a system is provided including: i) a self-contained onboard communication system, the onboard communication system comprising a first peripheral device and an at least one second peripheral device, the first and second peripheral devices each comprising a non-transitory computer-readable medium, having stored thereon a computer program for data communication, the computer program having a plurality of protocols, the protocols being extensible, the protocols executable by a processor to cause the first and second peripheral devices to send data and commands between one another, the first peripheral device further caused to perform the steps of: directly controlling a satellite communication device; directly dialing the satellite communication device; sending data directly to the satellite communication device; and receiving data from the satellite communication device, each of said steps being performed without the assistance of an on-board server; ii) the satellite communication device; iii) a satellite; and iv) a base station, wherein the satellite communication device is programmed to send commands and transfer data between the satellite communication device and the satellite, the satellite for transferring data between the satellite and the base station.

The system may comprise a plurality of second peripheral devices.

In yet another embodiment, a system for communicating between an at least one application proximate an aircraft and a base station is provided, the system comprising: a first programmable peripheral device; a second programmable peripheral device; an onboard satellite communication device; a satellite; and the base station, wherein the at least one application collects data, the second programmable peripheral device is programmed to send and receive data and commands from the first programmable peripheral device and comprises software and an interface to the first programmable peripheral device, the first programmable peripheral device is programmed to send commands and the data to the onboard satellite communication device and to receive data from the onboard satellite communication device without the assistance of an on-board server, and comprises software, a messaging tool, and a controller for the onboard satellite communication device and wherein the onboard satellite communication device is programmed to send commands and transfer data between the satellite communication device and the satellite, the satellite for transferring data between the satellite and the base station.

DEFINITIONS

Dongle: A dongle is a simple device that is directly connected to a port on a satellite communication device in order to provide the hardware to support additional connection options to the satellite communication device. Additional connection options may be WiFi or Bluetooth.

SMS: Short Message Service. The primary motivation for the creation and use of SMS language was to convey a comprehensible message using the fewest number of characters possible.

TCP/IP: Transmission Control Protocol (TCP) and Internet Protocol (IP).

OS: A mobile operating system.

ATTN: Attention, a command character to signal a device request. A common use for ASCII control character known as BEL or Bell, hex 0.times.07 is used to signal attention to a device.

CRC: Cyclic redundancy checksum. A method of ensuring data is intact and unmodified. The CRC word is part of the CRC'ed data.

MSGID: Message identifier, or type a message identifier is assigned to each message—defines semantic meaning.

SUBID: Subordinate identifier of the message, further defining the message semantic meaning.

ACK: Acknowledgement byte, specifically in this case we reference the ASCII control character set. ACK, hexadecimal 0.times.06 (decimal 6).

NAK: Negative acknowledgement byte, specifically in this case we reference the ASCII control character set, NAK, hexadecimal 0.times.15 (decimal 21).

Wi-Fi: A technology allowing devices to exchange data wirelessly over a computer network, including hi-speed Internet connections. It is any wireless network based on Institute of Electrical and Electronic Engineers (IEEE) 801.11 standards.

WLAN: Wireless Local Area Network.

Proximate: In the context of the present technology, proximate means that the second peripheral device is outside the aircraft, but close enough to communicate directly with the first peripheral device.

DESCRIPTION OF THE INVENTION

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and components similar or equivalent to those described herein can also be used, the acceptable methods and components are now described.

System

Figure 1:
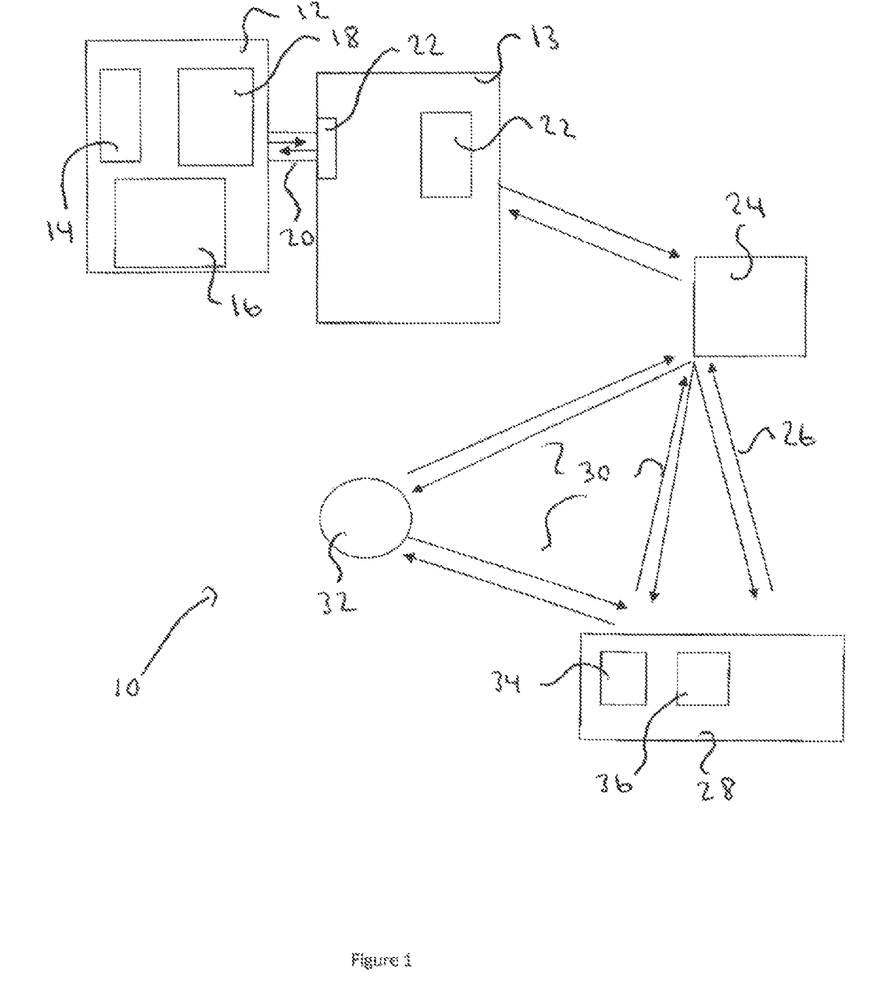
FIG. 1 is a block diagram of the system of the present technology.

The main components of the communication system for soft wireless dialing and messaging, generally referred to as 10, is shown in FIG. 1. A first programmable peripheral device 12 connects to the onboard satellite communication system, or integrated aeronautical communications device 13. It has software 14, a software keypad 16 and a messaging tool 18. The device may be, but is not limited to an iPad®, an iPhone® and an Android® device. The onboard satellite communication device 13 generally supports narrow band networking for aircraft requiring text messaging, email, file transmission, internet access and voice communication and therefore it is a data and voice satellite communication device that has the firmware or software in the unit to support the protocol. It need not support voice communication. The connection is a Wi-Fi to serial dongle, which provides an "access point" 20 that the mobile device 12 then connects to using its built-in Wi-Fi, or is a Bluetooth® to serial dongle, or a Universal Serial Bus (USB) to serial wired connection, or is a Bluetooth or Wi-Fi direct, or any other direct cable connection such as USB or Lightning® with the onboard satellite communication device 13 having a modem for this connection. Software or firmware applications 14 in the first programmable peripheral device 12 communicate to the onboard satellite communication device 13 sending commands to the onboard satellite communication device 13 using firmware or software 22 in the communication device 13. Note that error detection is inherently part of the transmission protocol. The onboard satellite communication device 13 communicates with a satellite 24, which in turn transmits via a satellite network 26 either directly to the base station 28 or via the Internet 30 to the recipient device (base station) 28 or to a cloud 32 and then the base station 28, where the data are decoded. The communication system 10 provides the connectivity required for reliable text and binary messaging utilizing a processing device 34 with software or firmware 36 at the base station 28, to provide the base station applications, and the first programmable peripheral device 12 applications communicating with onboard satellite communication system 13. This allows for a user to dial the first programmable peripheral device 12, answer the first programmable peripheral device 12, receive and send 'canned messages' and receive and send general satellite data and SMS.

Figure 2A:
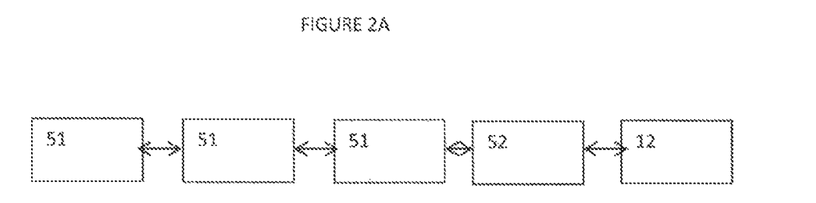
FIG. 2A is a block diagram of a series of the peripheral devices of the present technology.
Figure 2B:
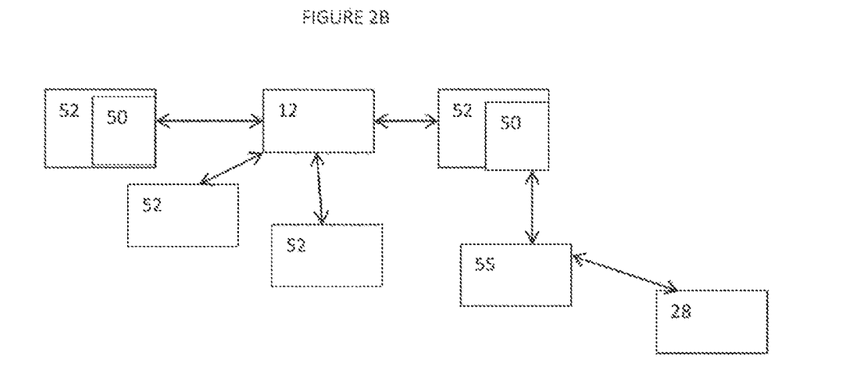
FIG. 2B is a block diagram of a plurality of peripheral devices of the present technology.
Figure 2C:
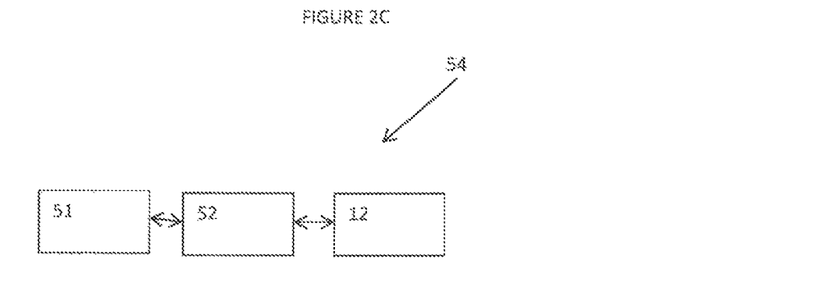
FIG. 2C is a block diagram of the onboard communication system of the present technology.

Both the first programmable peripheral device 12 and a second programmable peripheral device 52 include applications 50. A shown in FIG. 2A, there may be a plurality of peripheral devices 51 that communicate in a series with the second programmable peripheral device 52, which then communicates with the first programmable peripheral device 12. The series may be static, as in the same devices always communicate with one another, or it may be dynamic, as in different devices may be in the series at different times or different devices within the series may be active at different times. As shown in FIG. 2B, there also may be a plurality of second programmable peripheral devices 52 that communicate with the first programmable peripheral device 12. The communication is bidirectional with both commands and data being sent. Any application 50 on the aircraft may have data and commands sent through the first programmable peripheral device 12. Any application 50 on the aircraft may also have data and commands sent from the base station 28 or a third party through a wireless communication link 55. The wireless communication link may be, for example, but not limited to, Wi-Fi, a VHF (Very High Frequency) communication link, or an HF (High Frequency) communication link. As shown in FIG. 2C, the onboard communication system, generally referred to as 54, sends and receives messages and commands without the assistance of an on-board server and without the assistance of a ground-based or cloud-based communication system—in other words, the onboard communication system is self-contained within the aircraft.

Commanding and Controlling the Satcom Device

A user inputs numbers into the first programmable peripheral device 12 using the software keypad 16, as would be known to one skilled in the art. The software or firmware applications 14 in the first programmable peripheral device 12 include instructions or protocols to instruct the peripheral device to perform a number of functions, including controlling a satellite communication device by sending commands, dialing the satellite communication device, sending data to the satellite communication device, and receiving data from the satellite communication device. By using a first peripheral device to control the satellite communication device, there is no requirement for specific hardware or purpose built screens, but rather, the device relies upon software to control a satellite communication device.

As would be known to one skilled in the art, the first peripheral device would request system information from the satellite communication device in order to connect to it before providing commands.

As would be known to one skilled in the art, the satcom device is used to determine position by communicating with a Global Navigation Satellite System (GNSS) and to then send that data. As the first peripheral device controls the satellite communication device, it therefore controls when the position is determined, when the position is reported, where it is reported to and how it is reported. This may include commanding the satellite communication device to trigger emergency tracking mode.

The trigger for emergency tracking mode can be automatic and determined by preset conditions that the aircraft must meet, for example an excessively high rate of descent. The trigger for this mode may also be receipt of a message from the base station 28.

The emergency tracking messages may contain a code to identify the reason for entering the emergency mode. In addition, relevant information from other systems in the aircraft may be included, for example fuel remaining or fault indications.

Also, as would be known to one skilled in the art, the first peripheral device, in order to function in an acceptable manner, would constantly monitor for data sent from the satellite communication device and regularly query the device for new messages, position, signal strength and notifications such as a new message or text notification, message or text queued, message or text not queued, report transmitted, report queued, report not transmitted.

Further, as would be known to one skilled in the art, as the first peripheral device controls the satellite communication device, when a user wants to send and receive text messages, the first peripheral device controls the placing and receiving of satellite phone calls on the satellite communication device. This would include requesting the start of a call, requesting the end of a call, requesting call status (ringing, calling, idle and the like).

Telephony Dialing Control Message Format

Message Format

Canned Messages and Form Messages are used as a method to decrease the overall size of transmitted data. Canned Messages allow a single byte to transmit a message based on a lookup table. Form Messages, like Canned Messages, allow several user adjustable fields to be transmitted using a minimum data transmit size. Both Canned Messages and Form Messages require synchronization between the peripheral device 12 and the base station 28 to maintain a common context for a given message code, or form field. The administration of this synchronization is handled via the base station 28.

A special case of Canned Messages, referred to as Hybrid messages, allow additional user-defined data to be tagged with a Canned Message, like a single-field Form Message.

Canned (Pre-defined) Payload Type

As a method of decreasing the amount of data transmitted for a customer, binary codes can be transmitted in lieu of including the entire textual intent of a message. Canned messages may be administered through the base station and or any peripheral device. The messages are stored and may be 5 messages, or 9 messages, or 20 messages or more, or any number between and will be limited by the ability of the user to rapidly and accurately identify and use a specific message.

Form Payload Type

The first peripheral device firmware or software may store forms. These may be upgradeable through a configuration interface. The use of forms allows for compact transmission of several adjustable fields to the base station.

Messaging Protocol Between the Onboard Satellite Communication System and the Peripheral Device It is up to the peripheral device to maintain a timeout for reception of a response for a given message.

Every messaging transaction must complete (with failure or success) before a new one is initiated.

Command and Data Transfer within the Aircraft

The first programmable peripheral device 12 may receive data from another application 50 running on a second programmable peripheral device 52 and then send it to the satcom 13 which communicates with a satellite 24, which in turn transmits via a satellite network 26 either directly to the base station 28 or via the Internet 30 to the recipient device (base station) 28 or to a cloud 32 and then the base station 28. An example of another application is to gather and send flight data from the aircraft periodically. These include, for example, but not limited to engine settings, control surface configurations and other monitored aircraft parameters.

The first programmable peripheral device 12 may receive data messages from the base station 28 sent to another application 50 running on the second programmable peripheral device 52. The first programmable peripheral device 12 may remove the proprietary payload wrapper. These data messages may originate outside the base station 28 and be wrapped and forwarded on behalf of a third party. For example, but not limited to notification that a flight plan filing was accepted may be sent to a flight plan filing application running on the second programmable peripheral device 52.

EXAMPLES

Flight Event or Exceedance Notifications

An application 50 on a programmable peripheral device 12, 52 may be watching the aircraft data busses for anomalous flight conditions, on these conditions being met it autonomously commands the first programmable peripheral device 12 to have a notification message sent to the base station 28. This information can be forwarded on to interested third parties, such as the airline operator.

The application 50 monitoring the aircraft data busses may be running on the same peripheral device as the first programmable peripheral device 12 or it may run on a second programmable peripheral device 52 that connects in turn to the first programmable peripheral device 12. The flight data monitoring application may be monitoring data on ARINC 717, ARINC 429, ARINC 787 busses, it may also have its own direct electrical inputs from aircraft sensors or internal GNSS and inertial measurement sensors. These inputs are aggregated together and evaluated against predetermined rules in order to trigger alert notifications.

An example alert would be an excessive airspeed with flaps extended. In order to detect this scenario the programmable peripheral device 12, 52 would require an input for the flap position and an input for the airspeed, with appropriate filtering for signal noise. These inputs can be evaluated against a pre-programmed table of allowed airspeed and flap position combinations in order to determine whether the current aircraft configuration is within the permitted flight envelope. An excursion from the permitted range can be the trigger for the programmable peripheral device 12, 52 to command the first programmable peripheral device's 12 messaging tool 18 to transmit a notification of the exceedance to the base station 28. It will be apparent to one skilled in the art that many other aspects of the flight envelope can be similarly monitored for exceedances.

The triggered notification message can contain a payload defined by the flight data monitoring peripheral, and as an example may contain the current state of the aircraft (for example, but not limited to location, configuration, or velocity). The message would also contain an event code uniquely identifying the type of exceedance that was detected.

Upon command the first programmable peripheral device 12 will queue the message for transmission and negotiate with the satcom 13 via the existing connection (either WiFi, Bluetooth, serial, USB or Ethernet). The satcom 13 will add identifying information and an error detection footer to the notification message before dispatching it via the satellite network to the base station 28. The satellite ground station will relay the notification message to the base station 28 where it is decoded and recorded into a database.

Upon receipt of a notification the base station 28 checks its internal table of rules for handling notifications to determine further action that may take place. For example, a rule may exist to trigger an email notifying the operator of a flap overspeed event. It will be apparent that there are many options for actions that can be taken upon receipt of the exceedance notification, including, but not limited to email notification, SMS notification, popup in a website, and automatic forwarding to a third party web service.

Streaming Flight Data

An application on the second programmable peripheral device 52 may command the first programmable peripheral device 12 to open a new data connection to stream flight data to the base station 28.

The Streaming Flight Data Application (SFDA) may be running on the first peripheral device or it may be running on a second programmable peripheral device that is connected to the first programmable peripheral device 12 via an interface such as, but not limited to WiFi, Bluetooth, or cable. The SFDA can command the first programmable peripheral device 12 to open a long lived satellite data connection and continually transmit flight data over it. The flight data is sourced from the aircraft's ARINC 717, 429 or 787 busses, or may be based on internal sensors of the second peripheral device 52 such as GNSS receiver or an inertial measurement unit, or directly via electrical inputs sampling voltage or current or counting pulses.

The flight data are aggregated together from the above mentioned sources and time stamped by the SFDA before being sent to the first programmable peripheral device 12 for relay to the base station 28. The first programmable peripheral device 12 maintains the stream connection to the base station 28 and can insert additional messages into the stream that are split out by the base station 28. In this way the there is no interference with messaging functions of the first programmable peripheral device 12.

When the flight data stream is received at the base station 28 it is recorded to a log file, as well as scanned for noteworthy events. The data stream may be forwarded on to a third party, such as the aircraft operator or the engine manufacturer. By decoding the data stream from the aircraft a near real time representation of the current aircraft state can be presented. The manner of this presentation may take the form of time series graphs, tabular data or a reproduction of the aircraft instrument panel.

Control of the flight data streaming can be either via messages relayed to the SFDA by the base station 28 and first programmable peripheral device 12, or autonomously by the SFDA when it detects an anomalous event. For example, the SFDA may start streaming data to the base station 28 via the first programmable peripheral device 12 upon detecting an engine fault. Alternatively, a maintenance operator may use his ground terminal to send a command to the SFDA on the aircraft to start streaming data.

Flight Plan Filing

An application 50 on the second peripheral device 52, such as a flight plan filing application, may autonomously command the first programmable peripheral device 12 to send a message to the base station 28. For example a flight plan message for forwarding onto the air traffic system may be sent.

The Flight Plan Application (FPA) on the second programmable peripheral device 52 accepts input from the pilot to define the flight plan. When the pilot is satisfied that the correct plan is entered he can submit it to the Air Traffic System (ATS). In order to deliver the flight plan to the ATS the FPA commands the first programmable peripheral device 12 to use the messaging tool 18 to send a flight plan message to the base station 28, via the satellite communication device 13. Upon receipt of the message the base station 28 forwards the flight plan to the ATS for filing. The ATS generates a response to the flight plan filing and this response is relayed to the base station 28. The base station 12 in turn sends the flight plan response to the satcom device 13 which delivers it to the first programmable peripheral device 12. The first programmable peripheral device 12, expecting the response, then sends the flight plan response to the FPA, which displays it to the pilot.

Weather Report Request

An application on the second programmable peripheral device 52 may command the first programmable peripheral device 12 to send a message to the base station 28 to request a weather report for a given airport or location. The first programmable peripheral device 12 may reside on the same peripheral device 12 or on a second programmable peripheral device 52.

The application 50 commands the first programmable peripheral device 12 to initiate the request. The first programmable peripheral device 12 will then package the request to include any additional data including the requested airport code or the requested location. The first programmable peripheral device 12 may automatically include this location data if a GNSS receiver is available. The first programmable peripheral device 12 will then instruct the satcom 13 to forward the data package on to the base station 28.

The base station 28 may then respond directly or forward the request to a third party system and await its response. The response will then be forwarded back to the satellite communication system and on to the first programmable peripheral device 12. The first peripheral device 12 will then unpack the message and pass any relevant content back to the application 50 on a second programmable peripheral device 52.

Drop Tracking

An application 50 on the second programmable peripheral device 52 (in this case 52 may be an flight data monitor and recorder) for monitoring retardant tanks on an air tanker may command the first programmable peripheral device 12 to send a data message indicating the volume of retardant and location of a drop to the base station 28. The first programmable peripheral device 12 may reside on the same peripheral device 12 or a second programmable peripheral device 52.

The application 50 will monitor inputs or signals to determine if a drop or fill event has occurred. This may include, for example, but not limited to tank volume, tank door signals, tank switch signals or even signals from the tank or bucket controller. When this signal change is detected, the application 50 will gather related parameters including internal GNSS and inertial measurement sensors and form a data payload. In some instances, additional information such as retardant type, coverage levels, outside air temperatures and other measurements will be included with the payload.

This payload will be passed to the first programmable peripheral device 12 for transmission to the base station 28. The application 50 can directly command a first programmable peripheral device 12 to package the payload with additional information. This information may include GNSS data or any other sensor data available.

Upon receipt of the payload, the base station 28 may apply preconfigured rules for parsing and translating the data into engineering units. The base station 28 may also check its internal table of rules for handling the data to determine further action that may take place. For example, a rule may exist to trigger an email notifying the operator of a drop event. There are many options for actions that may be taken upon receipt of the data, including email notification, SMS notification, display and notification in a website, or automatic forwarding to a third party web service.

Aircraft Data Monitoring

The present system can also be used to send commands to any aircraft data monitoring device and to receive data from the aircraft data monitoring device. In some instances, the second peripheral device is an aircraft data monitor, for example, but not limited to a flight data recorder. In other instances, the aircraft data monitor may be, for example, but not limited to, an engine sensor or a temperature sensor, as would be known to one skilled in the art.

Pilot Phone Call

The second peripheral device may be a smartphone, headset or smartwatch connected to the first peripheral device via a short range wireless connection, other than cellular (for example, but not limited to WiFi or Bluetooth). The second peripheral device in this scenario contains an application that allows a user to initiate or answer voice calls on the satellite communication device. The audio data for the voice call is transferred between the satellite communication device, the first peripheral device and the second peripheral device so that the user may use the satellite communication device for a phone call while not directly connected to it. In effect the second peripheral device becomes a remote wireless handset for the satellite communication device.

All methods described herein can be performed in any suitable order unless otherwise indicated herein or otherwise clearly contradicted by context. The use of any and all examples, or exemplary language (e.g., "such as") provided herein, is intended merely to better illuminate the example embodiments and does not pose a limitation on the scope of the claimed invention unless otherwise claimed. No language in the specification should be construed as indicating any non-claimed element as essential.

Advantages of the exemplary embodiments described herein may be realized and attained by means of the instrumentalities and combinations particularly pointed out in this written description. It is to be understood that the foregoing general description and detailed description are exemplary and explanatory only and are not restrictive of the claims below. While example embodiments have been described in detail, the foregoing description is in all aspects illustrative and not restrictive. It is understood that numerous other modifications and variations can be devised without departing from the scope of the example embodiment.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize, or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A system for communicating within an aircraft and between an aircraft and a base station, the system comprising: a first programmable peripheral device, the first programmable peripheral device programmed to directly control a satellite communications device in an aircraft without the assistance of an on-board server, the first programmable peripheral device comprising software and a messaging tool; an at least one second programmable peripheral device, the second programmable peripheral device comprising software, an interface to the first programmable peripheral device, and an at least one application, the second programmable peripheral device programmed to send and receive commands and data between the application and the first programmable peripheral device; a satellite; and the base station, wherein the satellite communications device is programmed to send commands and transfer data between the satellite communication device and the satellite, and the satellite is configured to transfer data between the satellite and the base station.

2. The system of claim 1, wherein the first programmable peripheral device further comprises an extensible protocol for data transfer directly to the satellite communications device, including messaging, texting, and Short Message Service (SMS).

3. The system of claim 2, wherein the first programmable peripheral device communicates to the satellite communications phone sending commands to the satellite communications device and sending data to and receiving data from the satellite communications phone.

4. The system of claim 3, further comprising an aircraft data monitoring device.

5. The system of claim 3, wherein the second peripheral device is a flight data monitoring device.

6. The system of claim 3, wherein the first peripheral device further comprises a keypad.

7. The system of claim 3, wherein the second peripheral device comprises a plurality of applications.

8. The system of 7, further comprising a plurality of programmable peripheral devices, each programmable peripheral device comprising software, an interface to another programmable peripheral device, and an at least one application, the plurality of programmable peripheral devices programmed to send and receive commands and data between the application and another programmable peripheral device.

9. The system of claim 8, wherein the plurality of programmable peripheral devices are functionally in a series, and the series of programmable peripheral devices are programmed to send the data from the second peripheral device to the first peripheral device via the series of peripheral devices.

10. The system of claim 9, wherein the series is a dynamic series.

11. A system for communicating between an at least one application in an aircraft and a base station, the system comprising: a first programmable peripheral device; a second programmable peripheral device; an onboard satellite communication device; a satellite; and the base station, wherein the at least one application collects data, the second programmable peripheral device is programmed to send and receive data and commands from the first programmable peripheral device and comprises software and an interface to the first programmable peripheral device, the first programmable peripheral device is programmed to send commands and the data to the onboard satellite communication device and to receive data from the onboard satellite communication device without the assistance of an on-board server, and comprises software, a messaging tool, and a controller for the onboard satellite communication device and wherein the onboard satellite communication device is programmed to send commands and transfer data between the satellite communication device and the satellite, the satellite for transferring data between the satellite and the base station.

12. The system of claim 11, wherein the first programmable peripheral device further comprises an extensible protocol for data transfer directly to the satellite communications device, including messaging, texting, and Short Message Service (SMS).

13. The system of claim 12, further comprising a plurality of programmable peripheral devices functionally arranged in a series, wherein the series of programmable peripheral devices are programmed to send the data from the second peripheral device to the first peripheral device via the series of peripheral devices.

14. The system of claim 11, wherein the satellite communication device is a satellite communications phone.

15. A method of communicating between an at least one application in an aircraft and a base station, the method comprising:
employing a first programmable peripheral device comprising software or firmware, and a messaging head to control a satellite communication device, without the assistance of an on-board server and a second programmable peripheral device comprising software, an interface to the first programmable peripheral device, and an at least one application;
sending commands and data to and from the second programmable peripheral device to the first programmable peripheral device;
transferring data directly between the first programmable peripheral device and the satellite communication device;
transferring data between the satellite communication device and a satellite;
transferring data between the satellite and the base station; and
decoding the data.

16. The method of claim 15, further comprising streaming aircraft data.

17. The method of claim 16, wherein the aircraft data are flight data.

18. A system including: i) a self-contained onboard communication system, the onboard communication system comprising a first peripheral device and an at least one second peripheral device, the first and second peripheral devices each comprising a non-transitory computer-readable medium, having stored thereon a computer program for data communication, the computer program having a plurality of protocols, the protocols being extensible, the protocols executable by a processor to cause the first and second peripheral devices to send data and commands between one another, the first peripheral device further caused to perform the steps of: directly controlling a satellite communication device; directly dialing the satellite communication device; sending data directly to the satellite communication device; and receiving data from the satellite communication device, each of said steps being performed without the assistance of an on-board server; ii) the satellite communication device; iii) a satellite; and iv) a base station, wherein the satellite communication device is programmed to send commands and transfer data between the satellite communication device and the satellite, the satellite for transferring data between the satellite and the base station.

19. The system of claim 18, comprising a plurality of second peripheral devices.

20. A system for communicating between an at least one application proximate an aircraft and a base station, the system comprising: a first programmable peripheral device; a second programmable peripheral device; an onboard satellite communication device; a satellite; and the base station, wherein the at least one application collects data, the second programmable peripheral device is programmed to send and receive data and commands from the first programmable peripheral device and comprises software and an interface to the first programmable peripheral device, the first programmable peripheral device is programmed to send commands and the data to the onboard satellite communication device and to receive data from the onboard satellite communication device without the assistance of an on-board server, and comprises software, a messaging tool, and a controller for the onboard satellite communication device and wherein the onboard satellite communication device is programmed to send commands and transfer data between the satellite communication device and the satellite, the satellite for transferring data between the satellite and the base station.

* * * * *